United States Patent
Bertram et al.

(10) Patent No.: US 10,372,783 B2
(45) Date of Patent: *Aug. 6, 2019

(54) PERSISTING THE STATE OF VISUAL CONTROL ELEMENTS IN UNIFORM RESOURCE LOCATOR (URL)-GENERATED WEB PAGES

(71) Applicant: International Business Machines Corporation, Armonk, NY (US)

(72) Inventors: Randal L. Bertram, Raleigh, NC (US); John S. Bragiel, Cary, NC (US); Edward N. Fink, Raleigh, NC (US); Brian O. Wood, Eagan, MN (US)

(73) Assignee: International Business Machines Corporation, Armonk, NY (US)

( * ) Notice: Subject to any disclaimer, the term of this patent is extended or adjusted under 35 U.S.C. 154(b) by 199 days.

This patent is subject to a terminal disclaimer.

(21) Appl. No.: 15/139,004

(22) Filed: Apr. 26, 2016

(65) Prior Publication Data

US 2016/0239477 A1    Aug. 18, 2016

Related U.S. Application Data

(63) Continuation of application No. 13/784,668, filed on Mar. 4, 2013, now Pat. No. 9,483,571.

(51) Int. Cl.
*G06F 16/958* (2019.01)
*G06F 17/27* (2006.01)
(Continued)

(52) U.S. Cl.
CPC ........ *G06F 16/958* (2019.01); *G06F 17/2705* (2013.01); *G06T 11/20* (2013.01); *H04L 67/02* (2013.01)

(58) Field of Classification Search
CPC .. G06F 17/22; G06F 17/2235; G06F 17/2247; G06F 17/30; G06F 17/30014
(Continued)

(56) References Cited

U.S. PATENT DOCUMENTS

| 5,907,681 A | 5/1999 | Bates et al. |
| 6,167,453 A | 12/2000 | Becker et al. |

(Continued)

FOREIGN PATENT DOCUMENTS

| CN | 101122921 A | 2/2008 |
| GB | 2475816 A | 6/2011 |

OTHER PUBLICATIONS

Bertram et al., U.S. Appl. No. 13/784,668, filed Mar. 4, 2013.
(Continued)

*Primary Examiner* — Andrew R Dyer
(74) *Attorney, Agent, or Firm* — Zilka-Kotab, P.C.

(57) ABSTRACT

In one embodiment, a method for using a key to recreate a state of a visual control element includes retrieving a key from memory. The key represents a state of a visual control element to be output to a dynamically-generated web page. The method also includes parsing the key to obtain a plurality of key-value pairs representing parameters of a uniform resource locator (URL) which is used to recreate the visual control element. Also, the method includes outputting the visual control element to the dynamically-generated web page using the URL according to the state obtained from the key.

13 Claims, 8 Drawing Sheets

(51) Int. Cl.
*G06T 11/20* (2006.01)
*H04L 29/08* (2006.01)

(58) Field of Classification Search
USPC ........................................ 715/205, 208, 234
See application file for complete search history.

(56) References Cited

U.S. PATENT DOCUMENTS

| | | |
|---|---|---|
| 6,636,863 B1 | 10/2003 | Friesen |
| 6,826,594 B1 | 11/2004 | Pettersen |
| 7,072,934 B2 | 7/2006 | Helgeson et al. |
| 7,685,229 B1 | 3/2010 | George et al. |
| 8,407,576 B1 | 3/2013 | Yin et al. |
| 8,595,186 B1 * | 11/2013 | Mandyam ................ G06F 8/38 707/632 |
| 8,799,353 B2 | 8/2014 | Larsson et al. |
| 9,483,571 B2 | 11/2016 | Bertram et al. |
| 9,934,204 B2 | 4/2018 | Bertram et al. |
| 2004/0177147 A1 | 9/2004 | Joshi et al. |
| 2006/0031479 A1 | 2/2006 | Rode |
| 2006/0047728 A1 | 3/2006 | Kim et al. |
| 2007/0208641 A1 | 9/2007 | Smith et al. |
| 2007/0245238 A1 | 10/2007 | Fugitt et al. |
| 2008/0177994 A1 | 7/2008 | Mayer |
| 2008/0195483 A1 | 8/2008 | Moore |
| 2009/0070190 A1 | 3/2009 | Gorty et al. |
| 2009/0094377 A1 | 4/2009 | Zahavi et al. |
| 2009/0210781 A1 | 8/2009 | Hagerott et al. |
| 2009/0282096 A1 | 11/2009 | Kamrowski et al. |
| 2009/0313601 A1 | 12/2009 | Baird et al. |
| 2010/0138772 A1 | 6/2010 | Garcia et al. |
| 2010/0180082 A1 | 7/2010 | Sebastian et al. |
| 2010/0228963 A1 | 9/2010 | Kassab et al. |
| 2011/0119268 A1 | 5/2011 | Rajaram et al. |
| 2011/0161797 A1 | 6/2011 | Dewar et al. |
| 2011/0197124 A1 | 8/2011 | Garaventa |
| 2011/0264736 A1 | 10/2011 | Zuckerberg et al. |
| 2012/0060160 A1 | 3/2012 | Krauss |
| 2012/0191760 A1 | 7/2012 | Kaufman et al. |
| 2013/0080518 A1 | 3/2013 | Shionoya et al. |
| 2013/0238423 A1 | 9/2013 | Pottjegort |
| 2013/0326474 A1 | 12/2013 | Lane |
| 2014/0157106 A1 | 6/2014 | Bertram et al. |
| 2014/0157107 A1 | 6/2014 | Bertram et al. |
| 2014/0250366 A1 | 9/2014 | Bertram et al. |

OTHER PUBLICATIONS

David, Jean-Luc, "Cookielessdata Persistence is possible using these viable strategies," Tech Republic, Apr. 22, 2003, pp. 1-11.
Bertram et al., U.S. Appl. No. 13/691,629, filed Nov. 30, 2012, 48 pages.
Microsoft Computer Dictionary, Definition of "Dynamic Page," Microsoft Press, Fifth Edition, 2002, p. 182.
TechTarget.com, Definition of "Session ID," Jan. 2006, pp. 1-6, retrieved from http://web.archive.org/web/20101211095435/http://searchsoftwarequality.techtarget.com/definition/session-ID.

* cited by examiner

FIG. 3D

| Name | Access | Problems | Compliance | IP Addresses | OS Type |
|---|---|---|---|---|---|
| r4-b21-dr5-ope2.rtp. | No access | ☐ OK | ☐ OK | 10.34.23.93, ed21:dbbd: | |
| r4-c18-dr5-teo3.rtp. | No access | ☐ OK | ☐ OK | 10.34.23.111 | |
| r1-c4-gh2-ws1.rtp.ds | No access | ☐ OK | ☐ OK | 10.34.23.81, 11.121.2.1 | |
| r1-c4-gh2-ws2.rtp.st | No access | ☐ OK | ☐ OK | 10.34.23.101 | |

*Total: 23 Selected: 0*

All Operating Systems — 304
Actions — 306
308 — Access
310 — Problems
312 — Compliance
314 — Filter
316 — OS Type
302
300

PERSISTING THE STATE OF VISUAL CONTROL ELEMENTS IN UNIFORM RESOURCE LOCATOR (URL)-GENERATED WEB PAGES

BACKGROUND

The present invention relates to the use of web pages, and more particularly, to persisting the state of visual control elements in web pages constructed dynamically from widgets and resources specified in a uniform resource locator (URL).

For systems management web applications, many different web pages are composed from a variety of available and reusable widgets. A widget may be any code, application, or JavaScript class that creates an object, such as via implementation of a constructor, which takes or receives parameters and a pointer to a source document object model (DOM) node, such as a Dojo "srcNodeRef." Any of these widgets may be composites of one or more simpler widgets. In other words, each major area of a display may be rendered based on a "super-widget," which may include a plurality of simpler widgets and which may be reused to build many different web pages for display of information from a broad range of resources. For example, a "tree selector" widget may include a tree, a title, buttons, and possibly other sub-widgets of even simpler construction.

The web pages are composed from the widgets in a flexible way, so that new pages may be easily defined during prototyping and development. Moreover, new pages may be created in the field after installation of a system, after the product has shipped, so that a user's needs that may not be acknowledged or readily known during building of the system are capable of being addressed on site. Many systems management applications have a rich ecosystem of resources, along with different types of resources, and specified collections of resources. A large number of different pages are possible given these resources, using different permutations of the widgets and types/groups of resources.

When a table or a tree is output to a user on a web page dynamically constructed from re-usable widgets that pull resources from a specified URL, it is possible to maneuver through and manipulate the table and/or trees in many different ways prior to accessing a next web page which is dynamically rendered from the same or different URL. Any sort of manipulation or changes may be made, such as sorting columns and/or rows by a specific parameter or value in a table, adjusting widths of columns and/or rows in a table, filtering according to a specific criteria or parameter, selection of a particular row, column, or value in a table or tree, expansion of a branch in a tree, selection of a particular branch or node in a tree, etc.

However, any changes or manipulations that are made to any visual control elements, such as tables, trees, and other complex widgets, output on an initial web page are lost when the user navigates away from the initial web page to a subsequent web page, and then navigates back to the initial web page. This is because the initial web page is dynamically rendered each time it is accessed, according to conventional methods, with no ability to store visual control element or widget state information upon reloading.

Accordingly, when navigating between web pages built dynamically from a URL, it would be beneficial to maintain the last viewed state of any visual control elements and/or widgets which are output on a previously viewed web page when a user navigates back to that particular web page.

SUMMARY

In one embodiment, a method for using a key to recreate a state of a visual control element includes retrieving a key from memory. The key represents a state of a visual control element to be output to a dynamically-generated web page. The method also includes parsing the key to obtain a plurality of key-value pairs representing parameters of a URL which is used to recreate the visual control element. Also, the method includes outputting the visual control element to the dynamically-generated web page using the URL according to the state obtained from the key.

In yet another embodiment, a method for creating a key for storing a state of a visual control element. The method includes retrieving a URL used to create a dynamically-generated web page on which a visual control element is output. The method also includes parsing the URL in order to create a list of key-value pairs for each of a plurality of parameters specified in the URL. Moreover, the method includes alphabetizing the list of key-value pairs. Also, the method includes concatenating the alphabetized list of key-value pairs into a key represented by a string of characters. In addition, the method includes storing the key to a memory.

Other aspects and embodiments of the present invention will become apparent from the following detailed description, which, when taken in conjunction with the drawings, illustrates by way of example the principles of the invention.

BRIEF DESCRIPTION OF THE DRAWINGS

FIGS. 3A-3D show a series of web pages that detail changes that occur as a user navigates through a systems manager.

DETAILED DESCRIPTION

Figure 1:
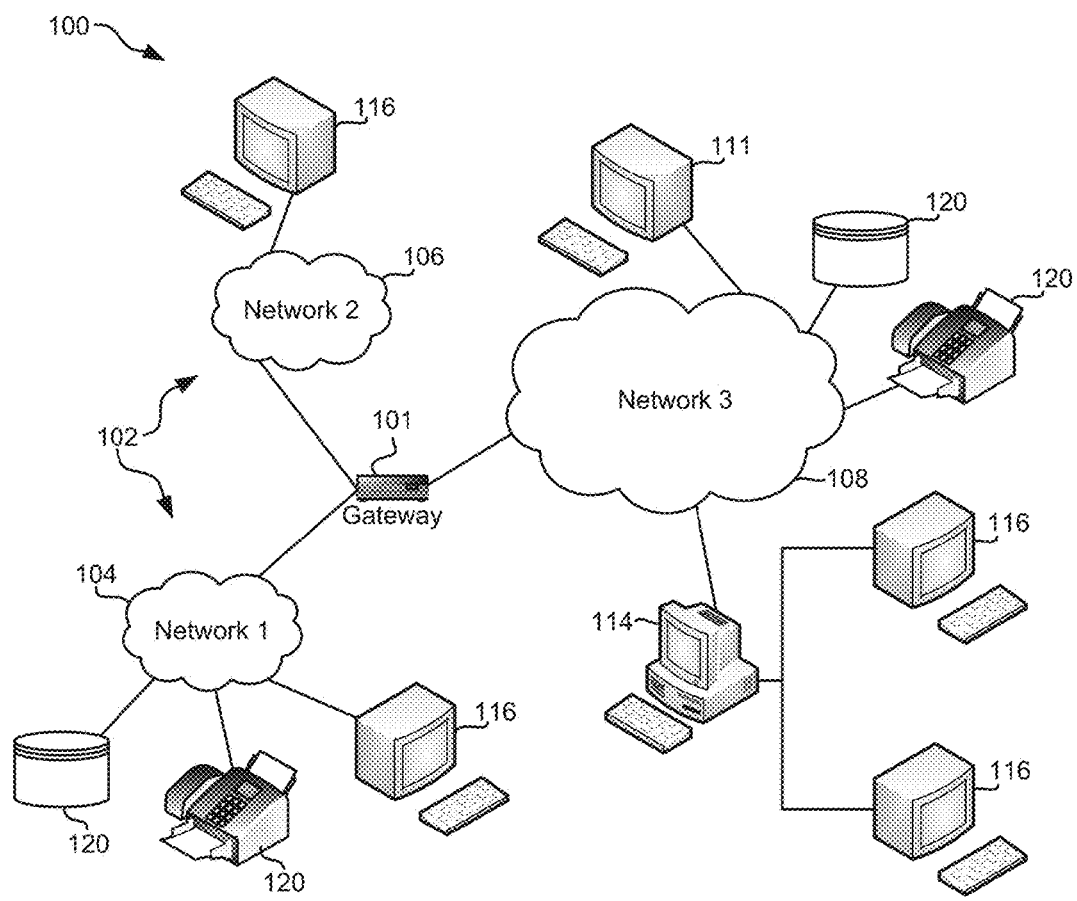
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As described herein in more detail, and according to various embodiments, the state of widgets, tables, and/or trees (and any other elements of a web page which may have their state changed, manipulated, or otherwise altered from an initial or default state, referred to herein collectively as "visual control elements") may be persisted in web pages that are dynamically rendered or built from widgets and resources specified in a uniform resource locator (URL). These "dynamically-generated web pages" are built from a URL by processing the URL's widgets and resources.

The URL's parameters specify the widgets and the resources which are used to build the dynamically-generated web page. These widgets and resources may be used as an input that is used to determine a key for storing and retrieving the state of tables and trees (visual control elements) on each dynamically-generated web page. The key may be constructed by processing the parameters of the URL while considering both the widgets and the resources. The algorithm may include intelligence to discard some parameters based on the values of other parameters or some other criteria, such as a state of the visual control element, web page type, etc. The end result is a key that creates the desired scope of the visual control element's state. Constructing the correct key causes the desired dynamically-generated web pages to share the same state of visual control elements therein, and prevents the state from being lost by the same dynamically-generated web page when reloaded later.

For more information on dynamically building a web page from widgets and resources specified in a URL, refer to U.S. patent application Ser. No. 13/691,629, filed Nov. 30, 2012. These types of web pages are referred to herein as "dynamically-generated web pages" for the sake of brevity.

In one general embodiment, a system for creating a key for storing a state of a visual control element includes a processor and logic integrated with and/or executable by the processor, the logic being adapted to: retrieve a uniform resource locator (URL) used to create a dynamically-generated web page on which a visual control element is output, parse the URL in order to create a list of key-value pairs for each of a plurality of parameters specified in the URL, concatenate the list of key-value pairs into a key represented by a string of characters, and store the key to a memory.

In another general embodiment, a computer program product for creating a key for storing a state of a visual control element includes a computer readable storage medium having program code embodied therewith, the program code readable/executable by a computer to: retrieve a URL used to create a dynamically-generated web page on which a visual control element is output, parse the URL in order to create a list of key-value pairs for each of a plurality of parameters specified in the URL, concatenate the list of key-value pairs into a key represented by a string of characters, and store the key to a memory.

In yet another general embodiment, a method for using a key to recreate a state of a visual control element includes retrieving a key from memory, the key representing a state of a visual control element to be output to a dynamically-generated web page, parsing the key to obtain a plurality of key-value pairs representing parameters of a URL which is used to recreate the visual control element, and outputting the visual control element to the dynamically-generated web page using the URL according to the state obtained from the key.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device, such as an electrical connection having one or more wires, an optical fiber, etc.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. Any type of processor may be used, such as a central processing unit (CPU), an integrated circuit (IC), an application specific integrated circuit (ASIC), a field programmable gate array (FPGA), a microprocessor, etc.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
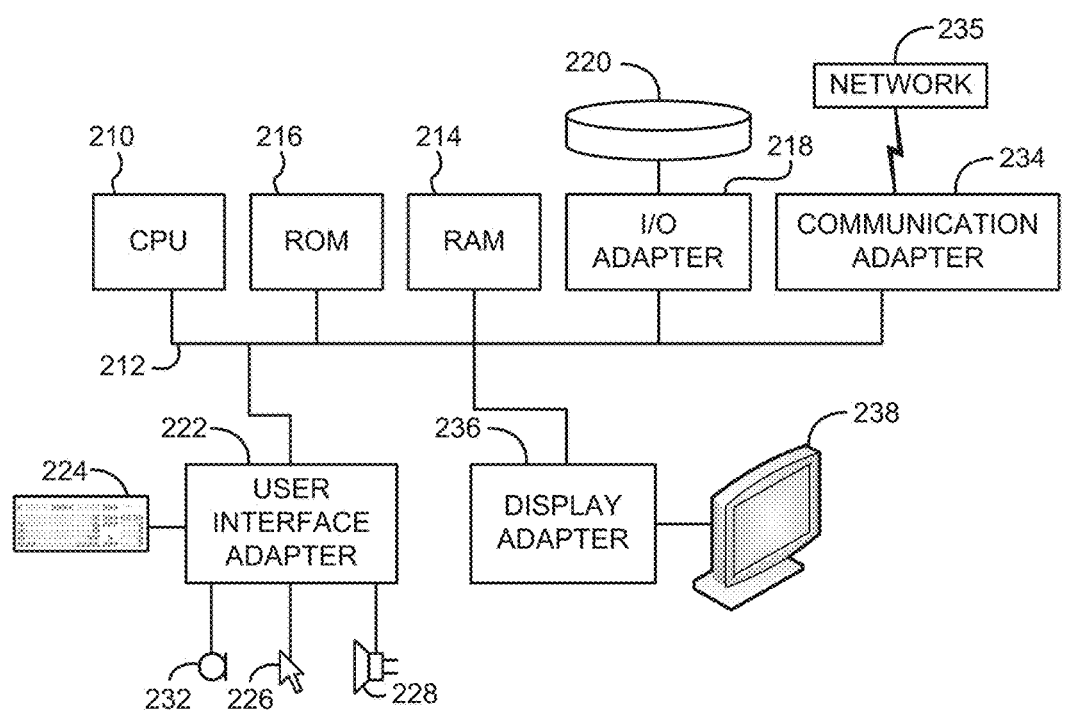
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

A dynamically-generated web page references a URL which comprises hash parameters specifying one or more widgets. Each of the widgets may be loaded to a specific area of the web page, which may be specified or particular to the widget being called. Furthermore, the size, look, and feel of the widget may be partially based on the web page to which it is constructed. For example, a selector widget may preferentially load to the left side of a web page by default, but a user setting or a reference in the URL may specify that the selector widget be loaded to the right side, bottom, or top of the page, as desired by the user.

In a further embodiment, the URL may also include one or more references corresponding to each widget. Each of the references may include, at a very minimum, a location of a resource or a location of a collection of resources. Other information may be included as well, such as name, type of resource, keyword for resource, or any other pertinent data. Any resource may be indicated by the URL, including by not limited to, a server, a processor, a memory or storage device, a connection, a relationship between devices in a network, a network interface, etc.

For the collection of resources, any separation of resources may be used to differentiate the resources into collections, as described herein and/or known in the art. For example, resources may be aggregated into a collection based on type, date stamp, usage, author, size, location, name, or any other discernible parameter known to be associated with resources.

In one approach, keywords may be used to load existing widgets or to specify new widgets to be loaded, the new widgets being either discovered locally by a computing system, or received and loaded with the loading of the URL. These keywords may be typically associated with standard widgets, such as dijits, or may be specified for customized widgets accessible to the computing system.

In one embodiment, resources may be allocated dynamically based on which resource(s) or collection(s) of resources are specified for each widget loaded to create the web page. Furthermore, as the web page, and particularly the widgets that form the web page, are interacted with and/or as conditions within the system, network, and/or resources change over time while a web page is loaded. In an attempt to more efficiently manage resource allocation and increase performance of the web page interaction, the resource(s) or collection(s) of resources allocated for any particular widget may dynamically change as well to match current conditions within the system and/or network.

According to another embodiment, resources unknown to the computing system when the web page is created may become available, and any widget which is allocated similar resources (such as a resource of the same type, having the same location, having the same characteristic, etc.) may be allocated the newly available resources as well, which may be added dynamically to a collection of resources or as another resource sorted by a particular widget.

In another embodiment, the web page may have context awareness, possibly through intelligent widget loading and/or management. For example, each widget may be loaded and/or managed after loading based on context of the computing system, widget, web page, etc., such as processor speed, processor capacity, display size, display capability, security rights to access sensitive information, number of widgets currently displayed, size of currently displayed widgets, color schemes, button size, etc. In this way, a web page and the widgets thereof may dynamically adjust for changing conditions of the system and/or network, possibly without the need for reloading or refreshing the URL.

In one example of problems which are encountered with current methods for dynamically generating web pages, with reference to FIGS. 3A-3D, a series of web pages are shown that detail changes that occur as a user navigates through IBM's Flex System Manager. Although IBM's system manager is shown, any systems management software may be used to render and navigate through dynamically-generated web pages, as would be understood by one of skill in the art. Furthermore, the images in FIGS. 3A-3D are exemplary only and not meant to be limiting on the presently described invention in any way, according to various embodiments.

Figure 3A:
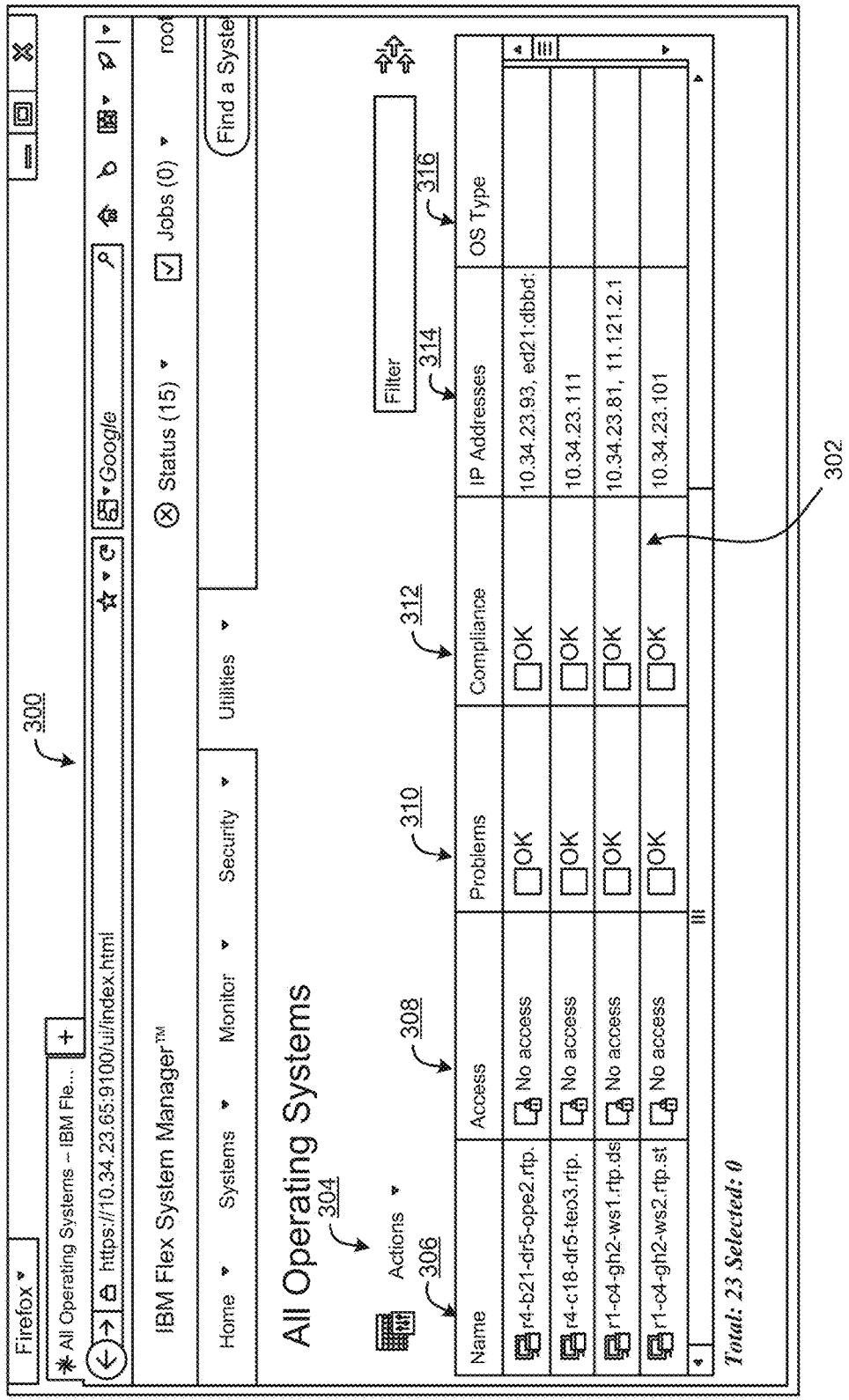

Referring now to FIG. 3A, assume that a user navigates to a web page 300 named "All Operating Systems." This web page 300 is dynamically generated, and one widget specified by the URL renders the table 302 output to the web page 300, and populates the table 302 with various resources, such as by using pointers to data, such as the name 306 of the various resources, accessibility 308 of the resources, any problem 310 indicated for the resources, compliance 312 of the resources, an IP address 314 for each of the resources, an operating system (OS) 316 associated with each of the resources, etc. Furthermore, other functions may be provided on the web page 300, such as the "Actions" pulldown menu 304, among other such functions, as would be understood by one of skill in the art. Furthermore, although a table 302 is used in this example, any other visual control element may encounter the same or similar problems to those described in FIGS. 3A-3D, and the descriptions provided herein are not limited to tables only, but may be used with any and all visual control elements, including but not limited to trees, lists, spreadsheets, graphs, and tables.

Figure 3B:
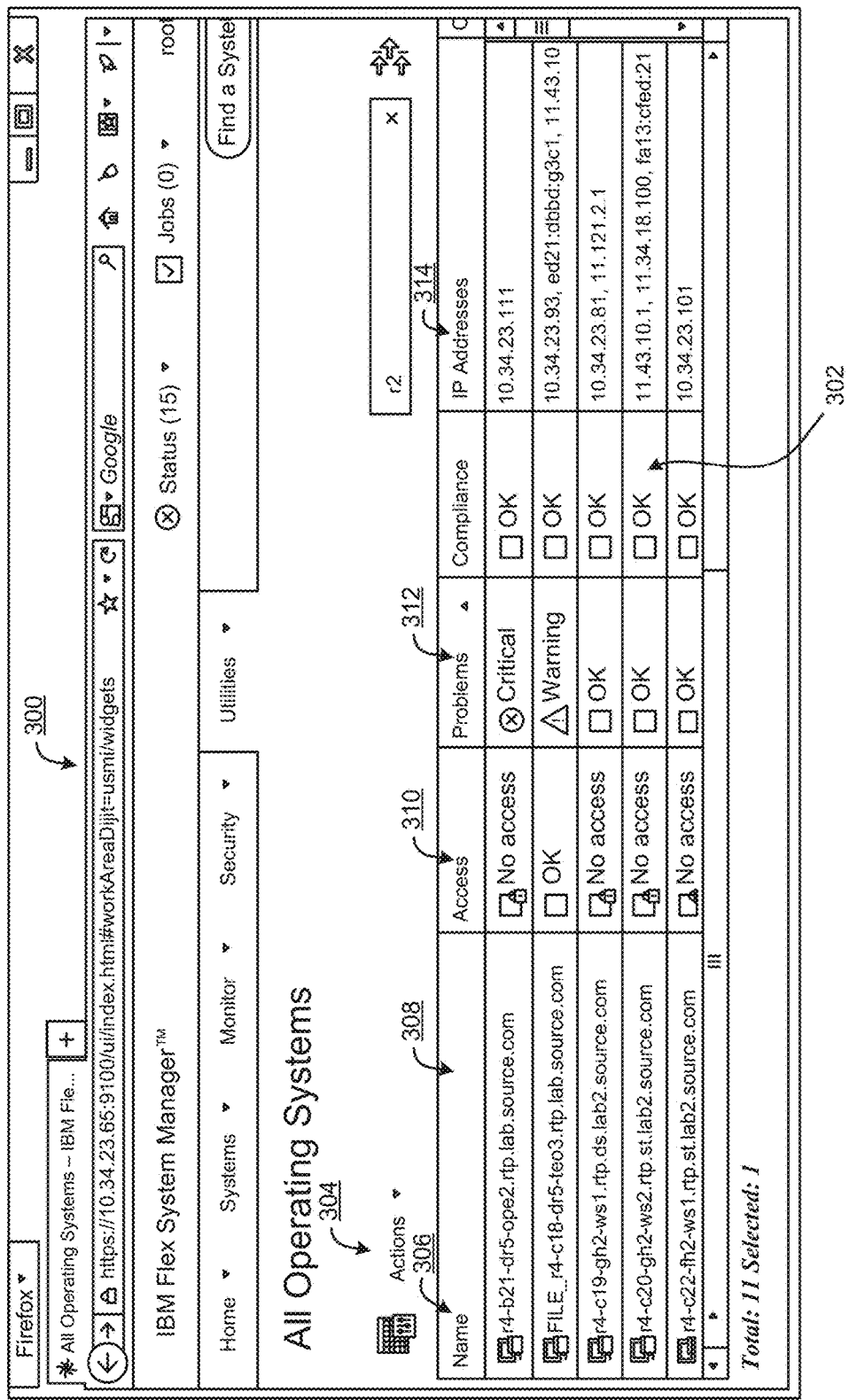

Now assume that the user adjusts the widths of the columns, sorts by the column indicating a problem 310 for the resource, filters the table 302 by value "r4," and selects the row containing a resource named "FILE_r4-c18-dr5-teo3.rtp.lab.source.com." As a result of these changes, as shown in FIG. 3B, the table 302 has clearly been manipulated in this view, with different resources and columns being viewable and selected, among other user-specified differences. From this view, the user is capable of accessing more specific information regarding the specified resource, such as details of the resource, usage of the resource, location of the resource, etc.

Now assume that the user navigates to a "Details" page associated with the resource named "FILE_r4-c18-dr5-teo3.rtp.lab.source.com," such as by manipulating the "Actions" pulldown menu 304 or right-clicking on the resource name and selecting "Details" from a popup menu.

Figure 3C:
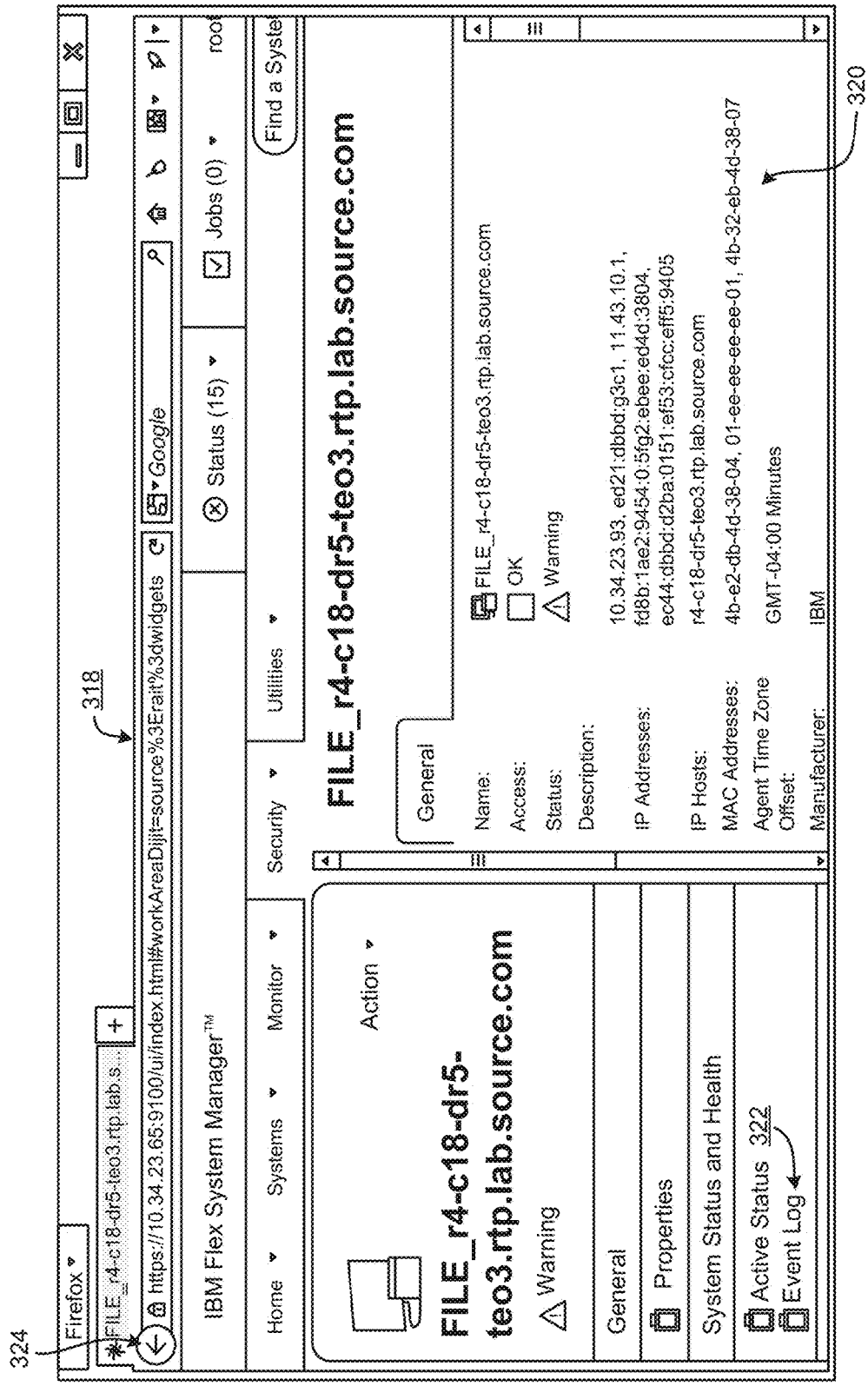

Once the user navigates to the "Details" page 318 as shown in FIG. 3C, many specific details about the resource are viewable in a table 320 generated to the right-side of the "Details" page 318. The user could navigate further to another web page which may include more information about the resource selected, other parameters associated with the resource, or any other useful information or data as would be understood by one of skill in the art.

However, for the sake of this example, assume that the user clicks on the "Back" button 324 of the browser, right-clicks on the web page 318 and selects the "Back" button from a popup menu, or in some other way navigates back to the "All Operating Systems" web page 300 as shown in FIG. 3D.

In this example of the prior art methods, the resulting web page 300 has lost the state of the table 302 as previously manipulated by the user prior to navigating to the "Details" page 318 as shown in FIG. 3C. Referring again to FIG. 3D, the columns have lost the widths that the user set, the rows are not sorted, there is no filter applied for "r4," and the particular row associated with the resource named "FILE_r4-c18-dr5-teo3.rtp.lab.source.com" is no longer selected. This is disorienting for the user since the user assumes that navigating back to a previously viewed web page would result in arriving at a view previously established by the user. In addition, and possibly more problematic, this disconnect between a previously viewed web page and a returned-to web page may be very disruptive to the flow of a task being performed by the user. A user often performs multiple tasks on a given selection (row) in a table. However, due to the web page 300 not being able to maintain the state of the table as last viewed by the user, the user now must repeat the sorting and filtering to find the previously selected row again. Furthermore, depending on the size and number of resources of which the web page is outputting, this resorting and refiltering may experience significant delay. In addition, had the user selected multiple rows, the situation may be even worse.

Instead of returning a web page which was unchanged, like web page 300 at the start of the example, by navigating back to a previously viewed web page, the user expects to and should have seen a web page like that shown in FIG. 3B instead of the web page returned in FIG. 3D.

Any attributes of a visual control element may persist, as would be understood by one of skill in the art. A visual control element may be characterized as including one or more visual constructs, such as lines, boxes, circles, grids, patterns, etc. All of these visual constructs together with the data or information which is displayed by a visual control element form a state of the visual control element. Any aspects of the visual constructs may be stored and retrieved, such as sizing of the visual constructs, spacing between the visual constructs, a number of visual constructs displayed, color/thickness/style/etc. of any of the visual constructs, ordering of the visual constructs, etc., in order to store and retrieve the state of the visual control element which are generated using the various visual constructs.

According to various embodiments described herein, one type of visual control element, a table, may persist with any of the following attributes intact upon navigating back to a dynamically-generated web page which rendered the table initially (which allowed for manipulation of the table by a user): row height, column width, row and/or column sorting, parameter and/or value filtering, row and/or column selection, table highlighting and/or coloring, row and/or column hiding or unhiding, etc.

In addition, another type of visual control element, a hierarchical tree representation (referred to herein as simply a "tree"), may persist with any of the following attributes intact upon navigating back to a dynamically-generated web page which rendered the tree initially (which allowed for manipulation of the tree by a user): branch expansion(s), branch(es) collapsed, branch(es) selected, node(s) selected, tree size, tree coloring, node coloring, etc.

According to another embodiment, a dynamically-generated web page may persist with any of the following attributes intact upon navigating back to the dynamically-generated web page: data and/or entries input into any fields on the web page (such as text boxes, selections in a menu, etc.), selections of any toggle event input forms (such as radio buttons, check boxes, etc.), current viewing position as compared to total viewable area for the web page (e.g., the position of the currently viewed portions of the total web page), etc.

All of these changes to the various types of visual control elements (such as tables and trees) may be stored on a per-session basis, so that the states of the visual control elements are persisted until the user logs out. In another approach, and for better usability, any of the described attributes may be stored as a state of the visual control elements across multiple sessions, possibly on memory of a server hosting the web page, local memory storage, cloud storage, etc.

HTML5 local storage may be used to persist the state of the various visual control elements rendered for one or more dynamically-generated web pages according to one embodiment. In another approach, cookies may be used in addition to or in place of HTML5 local storage. Since page-oriented assembly is being used to render the dynamically-generated web pages, JavaScript variables cannot be used because the data would be lost each time a new page is loaded. However, if it is possible to persist JavaScript variables across multiple sessions/web page loads, then the JavaScript variables may be used.

According to various embodiments, a mechanism for storing information which allows the various attributes to persist is presented which is convenient, effective, and reliable.

In one embodiment, a key may be used to store and retrieve the state of a given visual control element, such as a table or tree. Some conventionally used methods of storing and retrieving do not work with dynamically-generated web pages.

Conventionally, each visual control element may have an identifier (ID) associated with it which could be used as a key for storing the state of the visual control element when using predefined web pages. However, since the visual control elements for dynamically-generated web pages are built dynamically when the web page is constructed, the IDs are generated automatically by the underlying widgets, and not hard-coded as they would be on a predefined web page that is not built dynamically. This leads to several problems, such as:

The IDs will not be unique across all web pages in a systems management environment, because each web page has its own scope and ID generation module. In the above example provided in FIGS. 3A-3D, the ID for the table 302 in FIGS. 3A and 3B may be the same as the ID for a table generated from FIG. 3C (for example, had the user selected the "Event Log" link 322 to generate an Event Log table).

There is no guarantee that the IDs for various visual control elements will be consistent when the same web page is constructed or built more than one time, such as a second, third, tenth time, etc. For example, the ID for the table 302 in FIG. 3D may be different than the ID for the table 302 in FIG. 3B.

Another common approach to store and retrieve states of various visual control elements when using predefined web pages is to give each individual web page a unique ID, and use that unique page ID as a key, perhaps in combination with some aspects of the visual control element. For example, a dojo.gridx table uses the URL of the web page as a default key when no ID is provided for the table upon creation. However, this method of providing a key also does not function properly for dynamically-generated web pages. There are several problems with this approach, such as:

There may be extra parameters in the one or more URLs, such as a timestamp parameter for cache-busting, which may cause the URLs to be unique when they are otherwise identical, thereby rendering the use of a URL for the key to not consistently track changes to a specific visual control element.

There is no guarantee about the order of the parameters provided by the URL. For example, two web pages may appear differently because some of the parameters are provided in a different order for the two different web pages; however, the parameters may be the same, and they may have the same values, which should provide for the same web page.

It is desirable for many dynamically-generated web pages to share the same key for visual control element persistence. With reference to the prior example provided in FIGS. 3A-3D, in the "Details" page 318 for the resource named "FSM_r2-c4-ch4-itme1.rtp.stglabs.ibm.com," suppose the user selects the "Event Log" link 322 in the selector. In the table 320 generated to the right-side of the "Details" page 318, assume that the user adjusts the column widths and sort order for the generated Event Log table. Then, later on in the same session, the user navigates to the "Details" page 318 for another resource, and once again selects the "Event Log" link 322. The user expects the same column widths and sort order that were set for resource "FSM_r2-c4-ch4-itme1.rtp.stglabs.ibm.com" to appear for their next chosen resource. However, this persistence is not achievable by keying to the specific web page.

Figure 4:
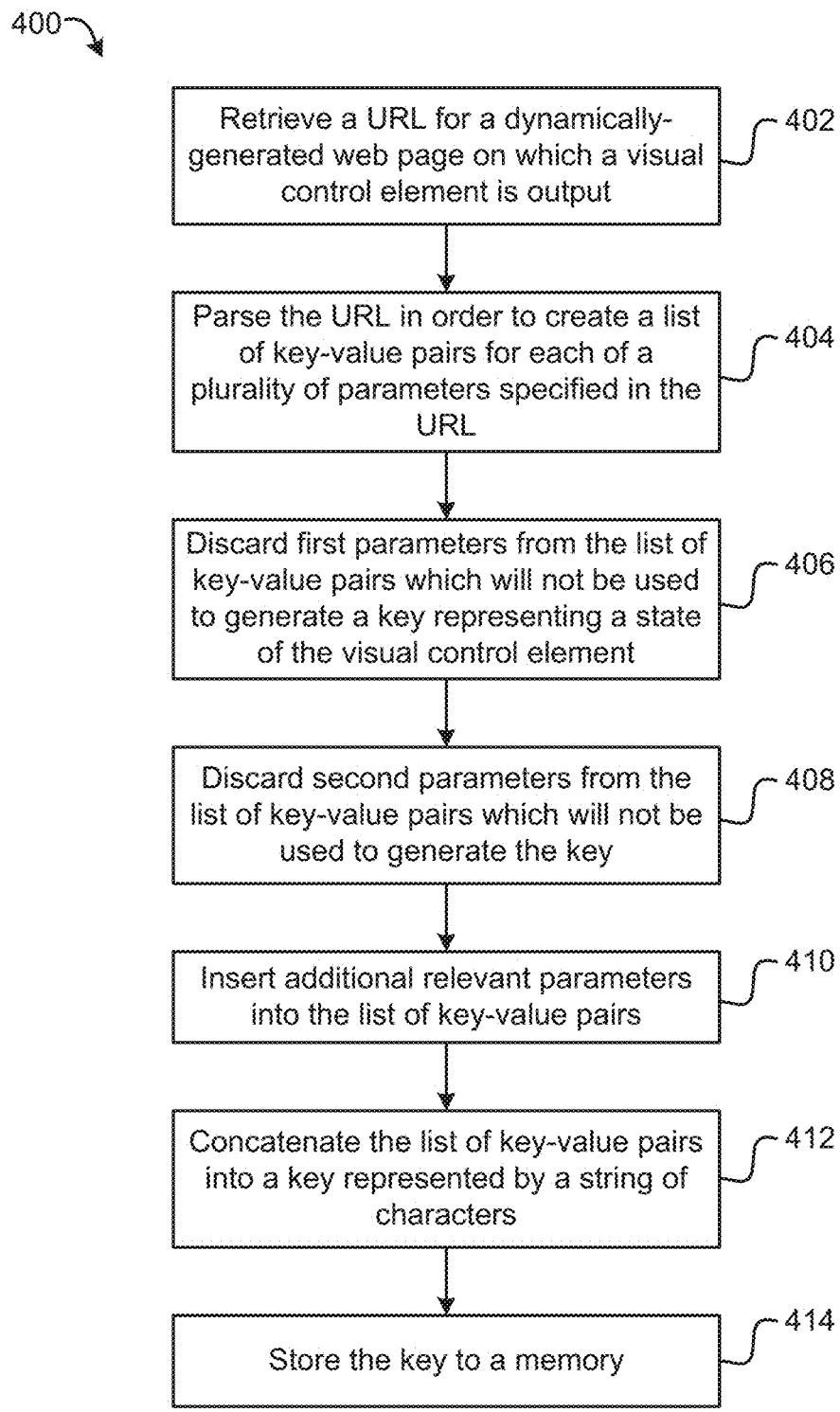
FIG. 4 shows a flowchart of a method, according to one embodiment.

Now referring to FIG. 4, a method 400 for creating a key for storing a state of a visual control element is shown according to one embodiment. According to one embodiment, in order to generate the key representing the state of the visual control element, an algorithm may be followed. The method 400 describes one such algorithm, and may be performed in accordance with the present invention in any of the environments depicted in FIGS. 1-3, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various non-limiting embodiments, the method 400 may be partially or entirely performed by an enterprise systems manager, a network controller, a computing system, a server, a processor (such as a CPU, an ASIC, a FPGA, etc.) which may be embedded in and/or operate within a system, etc.

As shown in FIG. 4, method 400 may initiate with operation 402, where a URL is retrieved for a dynamically-generated web page on which a visual control element is output.

In one embodiment, a widget which created or generated the visual control element may retrieve the URL. Furthermore, the visual control element may be a table or a tree, according to some approaches.

In operation 404, the URL is parsed in order to create a list of key-value pairs for each of a plurality of parameters specified in the URL. The parsing may be performed according to a predefined algorithm. In one approach, the list of key-value pairs may be alphabetized for easier navigation and manipulation, and to ensure a standard method of organizing the list of key-value pairs across multiple web pages and generations of web pages.

In operation 406, first parameters are discarded from the list of key-value pairs which will not be used to generate a key representing a state of the visual control element. The first parameters which are discarded may be selected from a set of first parameters that share a certain characteristic and/or are detectable using a particular methodology. First is not meant to indicate an order or sequence in which the parameters are selected, but instead is meant to indicate the first set of parameters whcih may be discarded.

The first parameters which are discarded are generally specific to an individual instance of a web page, such as a timestamp, and are not general to all instances of web pages generated based on the URL, e.g., these first non-essential parameters are unique to specific instances of a web page instead of providing specificity to a visual control element. Therefore, these first parameters should not be used to generate the key. Therefore, these first parameters which do not contribute uniqueness to the key are discarded.

According to one approach, a module may be adapted for determining and discarding these parameters which are not going to be used to generate the unique key The state of the visual control element is an instance of the visual control element as last viewed and/or modified by the user, which captures any specific visual changes to the visual control element.

In operation 408, second parameters are discarded from the list of key-value pairs which will not be used to generate the key. These second parameters include any additional non-essential parameters, such as parameters that are common to multiple instances of a visual control element. These parameters do not provide uniqueness to the key once it is generated because many different visual control elements may have the same value for these parameters.

Of course, a single operation (e.g., at least one of operations 406 and 408) may be used to discard unwanted parameters from the list of key-value pairs which are used to generate the key. In this way, any parameters which are non-essential, particular to a single instance of a visual control element, etc., may be discarded in a single operation.

In one approach, application-specific logic may be applied to the list of key-value pairs in order to discard the additional non-essential parameters.

For example, if selector=details (e.g., the selector parameter is "details"), then the web page generated is a "Details" page. In this example, the identifier of the dynamically-generated web page, referred to as a sourceToken in IBM's FSM, is discarded because it specifies the resource that the web page is focused on such that all "Details" pages share the same scope for any visual control elements output therein. Regardless of which file system is used, there is an identifier of the particular web page, and this parameter may be discarded in some instances.

In contrast, in the above example, if selector=eventlog (e.g., the selector parameter is "eventlog"), and the identifier of the dynamically-generated web page, such as the sourceToken, was discarded, then the "Event Log" table for each resource would have the same key, and the "Event Log" table would persist for all resources. This typically is not a desired outcome.

Accordingly, in one embodiment, such as via a user interface, the user is allowed to set up which visual control elements persist, and which do not, across multiple web page generations. However, this requires the user to make these decisions. However, in order to reduce the amount of action taken by the user, in another embodiment, a control algorithm may determine which visual control elements persist across the multiple web page generations and which do not. This type of persistence is typically desirable only for the "Details" page (selector=details) and not for other web pages. In other web pages, the identifier of the dynamically-generated web page, such as the sourceToken, is part of the identity of the visual control element, and should not be discarded, such as in the example of the "Event Log" table.

In another example, in IBM's Flex Systems Manager's "Hardware Map" page, the identifier of the dynamically-generated web page (e.g., the sourceToken) indicates which chassis is drawn in the rendered "Hardware Map" page, and therefore should not be discarded.

In operation 410, additional relevant parameters are inserted into the list of key-value pairs.

In one embodiment, application-specific logic may be applied to insert the additional relevant parameters.

For example, in one embodiment, if the visual control element is attached to a specific data set, then the ID of that data set may be used as part of the key, thereby providing a unique key for each of multiple visual control elements which are rendered on the same web page (such as multiple tables, trees, etc., which appear on the same web page) but which reference a different data set.

In addition, if the visual control element is given a specific ID by logic embedded in the web page (instead of allowing the ID of the visual control element to be set by the widget which created the visual control element), then that ID may be used as part of the key, according to one approach.

Furthermore, if and when the visual control element is empty and not attached to or does not reference any data set or other resource or source of information, then an "isEmpty" indicator may be attached to the visual control element as part of the key. Typically, this situation may occur when the visual control element is output to the user initially in a preliminary state, so the user may view the visual control element as it is rendered and filled, instead of a blank screen, while waiting for the data to populate the visual control element. However, even the empty visual control element should have a unique key as compared to the visual control element once it is populated with data at a later time, such as with the data set, in order to store this preliminary state of the visual control element.

In operation 412, the list of key-value pairs are concatenated into a key represented by a string of characters. In some approaches, the list of key-value pairs may be alphabetized prior to being ordered in the key. This resulting key may be used as the key which provides the identity and state for the particular visual control element.

In operation 414, the key is stored to a memory, such that it may be retrieved at a later time to rebuild the visual control element as it was last viewed/changed by the user. The memory may be any memory capable of storing the key, such as a local memory of a computer which loads the dynamically-generated web page, a server memory accessible by or used to create the dynamically-generated web page, or any other suitable memory known in the art.

Specifically, the resulting key may be used for storing the visual control element and state of the visual control element when last viewed. Furthermore, when the web page is rebuilt at a later time, the key may be referenced by the web page, the URL, or some other logic in order to recreate the visual control element on the web page.

According to one embodiment, the web page may be a user interface (UI), and the method 400 may further include receiving input from a user via the UI.

According to one embodiment, the web page may be output via a browser application, via a systems management application, or via some other suitable application local to or remote from the computing system which loaded the URL.

According to one embodiment, a system for creating a key for storing a state of a visual control element may include logic adapted to retrieve a URL used to create a dynamically-generated web page on which a visual control element is output; parse the URL in order to create a list of key-value pairs for each of a plurality of parameters specified in the URL; concatenate the list of key-value pairs into a key represented by a string of characters; and store the key to a memory.

According to another embodiment, a computer program product comprises a computer readable storage medium having program code embodied therewith, the program code readable/executable by a computer to: retrieve a URL used to create a dynamically-generated web page on which a visual control element is output; parse the URL in order to create a list of key-value pairs for each of a plurality of parameters specified in the URL; concatenate the list of key-value pairs into a key represented by a string of characters; and store the key to a memory.

Figure 5:
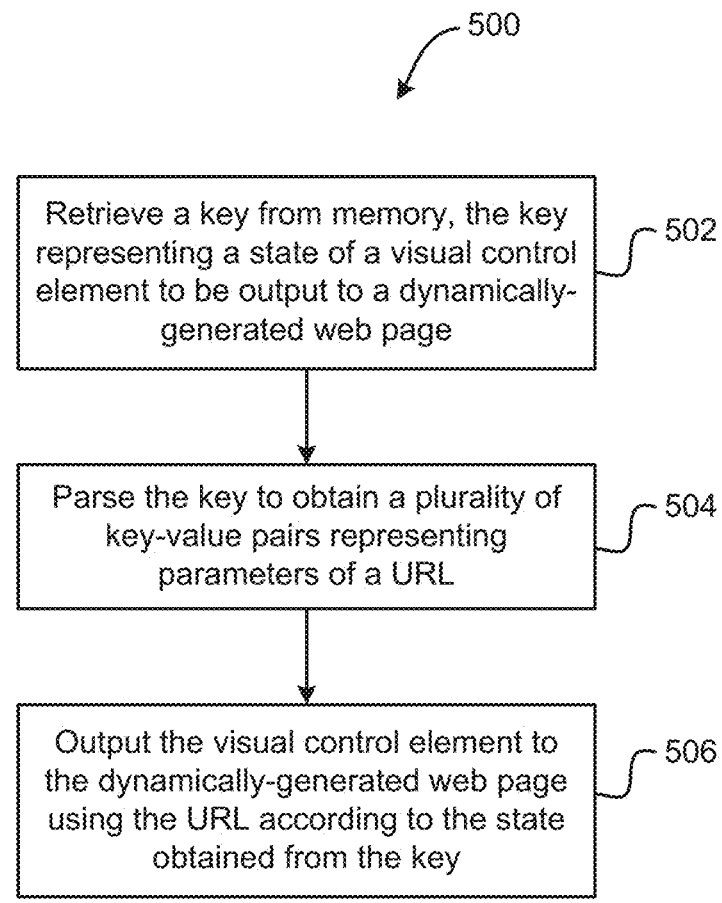
FIG. 5 shows a flowchart of a method, according to one embodiment.

Now referring to FIG. 5, a method 500 for using a key to recreate a state of a visual control element is shown according to one embodiment. The method 500 may be performed in accordance with the present invention in any of the environments depicted in FIGS. 1-3, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various non-limiting embodiments, the method 500 may be partially or entirely performed by an enterprise systems manager, a network controller, a computing system, a server, a processor (such as a CPU, an ASIC, a FPGA, etc.) which may be embedded in and/or operate within a system, etc.

As shown in FIG. 5, method 500 may initiate with operation 502, where a key is retrieved from memory, the key representing a state of a visual control element to be output to a dynamically-generated web page. The memory may be any memory capable of storing the key, such as a local memory of a computer which loads the dynamically-generated web page, a server memory accessible by or used to create the dynamically-generated web page, or any other suitable memory known in the art.

In operation 504, the key is parsed to obtain a plurality of key-value pairs representing parameters of a URL which is used to recreate the visual control element. The parsing may be performed according to a predefined algorithm, which may be a reverse of the parsing which was used to create the key.

In operation 506, the visual control element is output to the dynamically-generated web page using the URL according to the state obtained from the key.

According to one embodiment, the dynamically-generated web page may be a user interface (UI), and the method 500 may further include receiving input from a user via the UI.

According to one embodiment, the dynamically-generated web page may be output via a browser application, via a systems management application, or via some other suitable application local to or remote from the computing system which loaded the URL.

Any of the embodiments described above with respect to method 500 may also be incorporated into a system as logic, as would be understood by one of skill in the art.

Any other embodiments and/or approaches described in regard to method 500 may be included as computer program code in a computer program product, according to various implementations.

According to various embodiments, presented by way of example only, and not meant to be limiting on the invention in any way, IBM's Next Generation User Interface (NGUI) product for use with systems management applications, and specifically IBM's Flex System Manager, may be used in conjunction with approaches presented herein.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
creating a dynamically-generated web page using a uniform resource locator (URL), wherein a visual control element is output to the dynamically-generated web page and the URL references at least one widget and at least one resource to render the dynamically-generated web page on demand;
creating a list of key-value pairs for each of a plurality of parameters specified in the URL by parsing the URL;
determining one or more first parameters that are specific to an individual instance of a web page and do not provide specificity to any visual control elements;
discarding the one or more first parameters from the list of key-value pairs prior to concatenating the list of key-value pairs;
determining whether a data set is associated with the visual control element;
determining an identifier that specifically identifies the associated data set in response to determining the data set is associated with the visual control element;
determining the key includes an empty indicator in response to determining the data set is not associated with the visual control element;
inserting additional parameters into the list of key-value pairs prior to concatenating the list of key-value pairs;
concatenating the list of key-value pairs into a key represented by a string of characters; and
storing the key to a memory.

2. The method as recited in claim 1, comprising:
receiving input navigating away from the dynamically-generated web page;
receiving input navigating back to the dynamically-generated web page;
retrieving the key from the memory;
obtaining a state of the visual control element and a plurality of key-value pairs representing parameters of the URL by parsing the key; and
recreating the visual control element on the dynamically-generated web page using the URL according to a state obtained from the key after retrieving the key from the memory.

3. The method as recited in claim 2, wherein the dynamically-generated web page is configured to load and/or manage widgets based on a context of a computing system and/or a context of a network hosting the dynamically-generated web page;
wherein loading and/or managing the widgets comprises dynamically adjusting the widgets for changing conditions of the computing system and/or changing conditions of the network; and
wherein dynamically adjusting the widgets is performed without reloading or refreshing the URL.

4. The method as recited in claim 1, further comprising:
determining that one or more parameters are each independently included in multiple instances of the visual control element; and
discarding the one or more parameters from the list of key-value pairs prior to being concatenated into the key.

5. The method as recited in claim 1, wherein the memory is a local memory of a system which loaded the dynamically-generated web page.

6. The method as recited in claim 2, wherein the state obtained from the key is a previous state of the visual control element; and
wherein the previous state of the visual control element was established by a user during a previous interaction with the dynamically-generated web page.

7. A computer-implemented method, comprising:
retrieving a uniform resource locator (URL) that created a dynamically-generated web page on which a visual control element is output, wherein the URL references at least one widget and at least one resource to render the dynamically-generated web page on demand;
creating a list of key-value pairs for each of a plurality of parameters specified in the URL by parsing the URL;
determining one or more first parameters that are specific to an individual instance of a web page and do not provide specificity to any visual control elements;
discarding the one or more first parameters from the list of key-value pairs prior to concatenating the list of key-value pairs;
determining whether a data set is associated with the visual control element in response to determining the data set is associated with the visual control element, determining an identifier that specifically identifies the data set, and setting the identifier as one of a plurality of additional parameters of the visual control element;

in response to determining the visual control element is not associated with any data sets, setting an empty indicator as one of the additional parameters of the visual control element;

inserting the additional parameters into the list of key-value pairs prior to concatenating the list of key-value pairs;

concatenating the list of key-value pairs into a key represented by a string of characters;

storing the key to a memory; and retrieving the key from the memory and recreating the visual control element on the dynamically-generated web page using the URL according to a state obtained from the key after retrieving the key from the memory.

8. The method as recited in claim 7, wherein the memory is a local memory of a system which loaded the dynamically-generated web page.

9. The method as recited in claim 7, wherein the one or more first parameters comprise a timestamp.

10. The method as recited in claim 7, comprising:
determining that one or more first parameters are each independently included in multiple instances of the visual control element prior to discarding the one or more first parameters from the list of key-value pairs; and wherein the one or more first parameters comprise an identifier of the dynamically-generated web page.

11. The method as recited in claim 7, comprising alphabetizing the list of key-value pairs prior to the list of key-value pairs being concatenated into the key.

12. The method as recited in claim 7, comprising discarding one or more second parameters from the list of key-value pairs prior to being concatenated into the key, the one or more second parameters including parameters that are each independently included in multiple instances of the visual control element.

13. The method as recited in claim 7, further comprising obtaining the state of the visual control element and a plurality of key-value pairs representing parameters of the URL by parsing the key prior to recreating the visual control element on the dynamically-generated web page.

* * * * *